Sept. 12, 1967    N. D. HAUGEN    3,341,275
REMOTE CONTROL VISUAL ACUITY TEST PROJECTOR WITH ELECTRIC MOTOR
CARRIED BY FILM CHART AND COUPLED TO ASTIGMATISM TEST ELEMENT
Filed Oct. 21, 1963

INVENTOR.
NORMAN D. HAUGEN

BY
Schroeder & Siegfried

ATTORNEYS

United States Patent Office 3,341,275
Patented Sept. 12, 1967

3,341,275
REMOTE CONTROL VISUAL ACUITY TEST PROJECTOR WITH ELECTRIC MOTOR CARRIED BY FILM CHART AND COUPLED TO ASTIGMATISM TEST ELEMENT
Norman D. Haugen, Minneapolis, Minn., assignor to The Benson Optical Company, Minneapolis, Minn., a corporation of Minnesota
Filed Oct. 21, 1963, Ser. No. 317,471
4 Claims. (Cl. 351—30)

ABSTRACT OF THE DISCLOSURE

A visual acuity test projector operated by remotely controlled electric motor means. A first electric motor moves the test film chart vertically and a second electric motor, mounted on the upper end of the test film chart, rotates an astigmatism test element carried by the chart.

This invention relates to the field of visual acuity projectors, but more particularly to a means of remotely controlling the film chart used with the projector.

This invention is an improvement over the invention shown and described in my co-pending application entitled Visual Acuity Projector Film Chart Control, filed Jan. 9, 1963, under Ser. No. 250,438, now U.S. Letters Patent 3,294,473, issued Dec. 27, 1966.

As indicated in my co-pending application, the use of projectors in the visual acuity field has been a decided improvement over the old-fashioned wall charts but certain disadvantages continue to exist in the use of the projector. The main objection voiced by most operators, is that the projector should be within reach of the operator and yet the instruments being used for correctly fitting eye glass lenses must also be within reach of the operator and therefore the operators general work area is cluttered and cumbersome. The improvement set out in my co-pending application referred to above allows the operator to freely select certain charts or slides which generally make use of only one rotating pointer or image, one example being the model 1217–5C Robinson-Cohen slide manufactured by the American Optical Company, the slide being further described in Patent No. 2,065,430. While this improvement, disclosed in my co-pending application, overcomes an undesirable characteristic of the projector by being able to remotely control the projector and remove it from the so-called cluttered area, it does not allow the freedom of movement of the slide or film chart which is needed when one having a pair of rotatable pointers or images is used. For instance, the model 1217–5D Dual-Dial Paraboline slide manufactured by American Optical Company has a rotating pointer and a rotating paraboline test figure, the two being rotated simultaneously. The structure for remotely controlling the test figures in my co-pending application required that the slide or film chart be in its lowermost position before any rotational movement could be imparted to the slide or film chart. My present invention overcomes this disadvantage in that the rotating images may be rotated, regardless of whether one or the other is being projected by the projector, and regardless of the vertical position of the film chart.

Since the projector is generally mounted in a permanent location out of the way of the patient and operator who is fitting the eye glasses, any means which will allow the test figures just described to be rotated reduces the amount of time required for making the proper tests. Of course, the slides, as used in the past, required that the operator leave the location where the glasses were being fitted to properly rotate the paraboline test figures by hand.

The present invention contemplates using the projector with electro-mechanical controls so that the film chart may be driven to a position where it is desirable to rotate one of the test figures. In the instant invention, this is accomplished by providing a source of power connected directly to the film chart or test slide and the electrical power is supplied through the medium of brush contacts engaging contacts which have been secured to the slide. Since there are no electrical plugs or wires to be connected or disconnected, the slides are readily movable and replaceable within the projector in the same manner as when previously used with the manual knob.

It is therefore a general object of the present invention to provide a novel improvement in remote controls for visual acuity projectors.

It is a more specific object of the invention to provide means for remotely controlling the movement of the film chart and its rotating elements by a pair of power sources, one of which is attached to the film chart.

It is still another object of this invention to provide means in a visual acuity projector for remotely controlling the movement of the film chart and its rotating elements within a predetermined range of vertical movement of the film chart.

It is another object of the present invention to provide electrical contacts on the film chart for supplying electrical power to a source of rotating power attached thereto.

It is still a further object of the invention to provide a film chart with remote control means which may be movingly located without causing movement of the film chart or the rotating elements during such movement.

These and other objects and advantages of my invention will more fully appear from the following description, made in connection with the accompanying drawings, wherein like reference characters refer to the same or similar parts throughout the several views, and in which.

Figure 1:
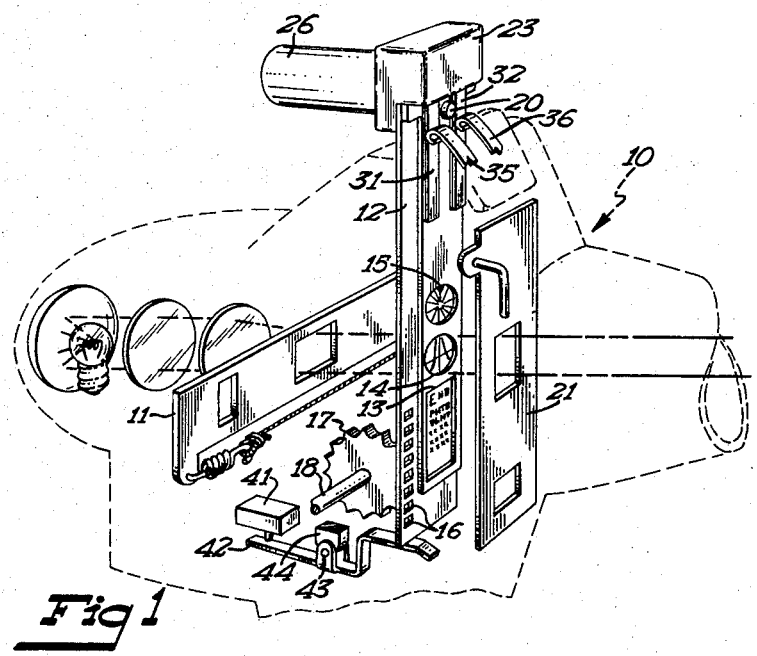
FIG. 1 is a diagrammatic view of the film chart showing its relative position in a projector and its driving mechanisms.

FIG. 1 shows a diagrammatic outline of a projector 10 which has a barrel containing several lenses to properly focus the images being projected upon a screen (not shown). Situated within the body of the projector between the forward lenses just described and the reflector, bulb, and condensing lenses, is a horizontally movable mask 11 and directly in front of mask 11 is a film chart. Film chart 12 contains numerous symbols and images such as those found in lower portion 13 and also contains a pair of rotatable elements 14 and 15. This part of the film chart is generally of greater thickness than the body portion of the chart which contains a plurality of sprocket holes 16 that normally engage a sprocket gear 17 driven through a shaft 18. Image 14 is the paraboline test figure referred to earlier and through internal mechanisms with film chart 12, which does not form a part of the invention, the rotatable elements are rotated between predetermined limits by a shaft 20 located at the top of the film chart 12. Located in front of film chart 12 is a vertically movable mask 21. This diagram shows the relative placement of the film chart with respect to the other parts on the projector and a further detailed description will be given of its operation.

Figure 2:
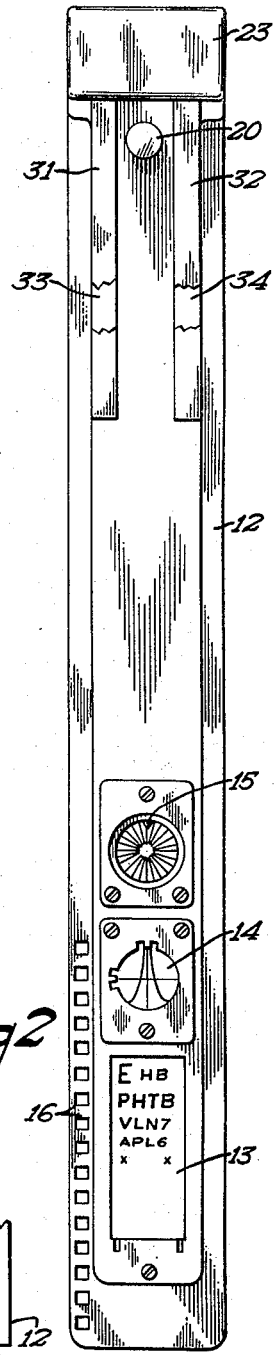
FIG. 2 is an elevational view of the film chart showing the relative location of the electrical contacts.

Shaft 20 which is connected to the rotatable elements of the film chart 12 has a spur gear 22 connected thereto and shaft 20 is journalled in a bearing within film chart 12 (not shown) and is journalled in a bearing formed in a housing 23 used to house the gearing structure. An idler gear 24 meshes with gear 22 and is journalled in housing 23 by a shaft 25. An electrical motor 26 is mechanically secured to housing 23 and has a shaft 27 which projects into the gear box or housing 23 and has a spur gear 30 connected thereto which engages idler gear 24. Thus as motor 26 rotates, motion is imparted to gear 30 and hence through a gear train to shaft 20 to drive the rotatable elements of film chart 12. Motor 26 is preferably of the direct current reversible type, although any reversible motor may be used. Electrical power is supplied to motor 26 through a pair of elongated electrical contacts 31 and 32 which may be formed of any suitable material having low resistance properties such as brass or copper. Contacts 31 and 32 are formed in strips and are cemented or fixedly held in place along the longitudinal direction of film chart 12. Contacts 31 and 32 are of course insulated by a pair of insulators 33 and 34 respectively to insure proper operation, and this is best seen by the broken away portions of contacts 31 and 32 shown in FIG. 2.

Figure 3:
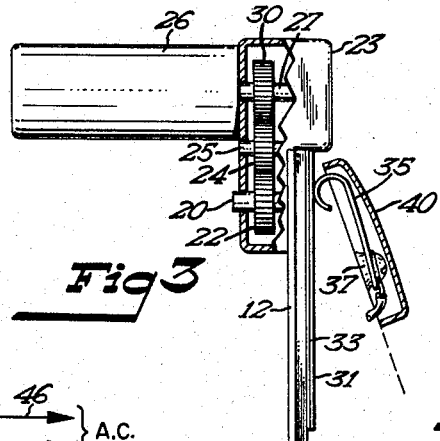
FIG. 3 is a partial section of the driving arrangement for the rotatable element of the film chart showing the electrical contacts in operable engagement.
Figure 4:
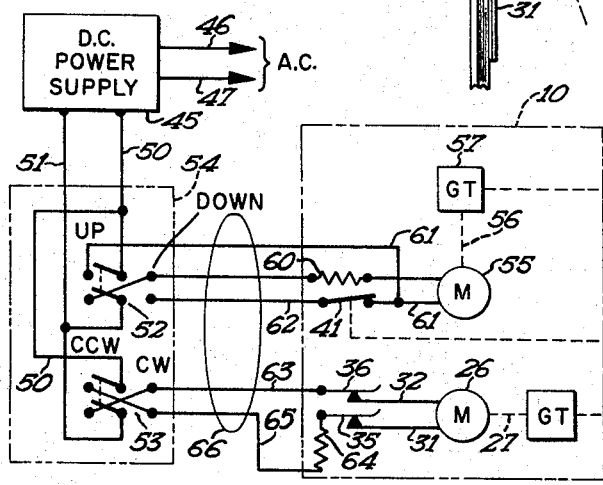
FIG. 4 is an electrical schematic of the remote control means.

A pair of resiliently urged electrical contacts 35 and 36 respectively engage contacts 31 and 32 and are held in place by proper insulation means such as post 37 shown in FIG. 3. Thus it will be seen that the brush type contacts 35 and 36 will engage contacts 31 and 32 while film chart 12 is being driven vertically upwardly and downwardly within projector 10. For protection of the operator in using the projector, a shield 40 which may form part of the housing of projector 10, covers contacts 35 and 36 so that the contacts are not exposed to the operator.

Film chart 12 is driven by sprocket gear 17 when engaged with the slot 16 of film chart 12. Upon film chart 12 reaching its upper most part position, it will be seen that sprocket 17 will merely cause chart 12 to oscillate over the teeth of sprocket 17 as it reaches the end of its travel since it will continue to be held within the projector and having reached the end of its travel merely rides over the top of each of the teeth on sprocket 17.

Film chart 12, in its downward movement, must be stopped when the slide reaches its lower limit and this is provided by using a miniature snap action switch 41 which is disposed in such a position that it may be actuated by a switch arm 42 which is pivoted about a pivot 43 which engages a projecting lug 44, formed as part of the projector housing 10. It will be seen that one end of switch arm 42 engages the lower end of the film chart 12 and thus switch arm 42 is rotated about pivot 43 to actuate switch 41. Thus, switch 41 forms a lower limit switch in the circuit which will be described more fully and which controls the film chart driving means.

The power to operate the slide is developed through a power supply 45 which is connected to an alternating current through a pair of conductors 46 and 47. A direct current from power supply 45 is supplied to a pair of conductors 50 and 51. Power supply 45 may be any suitable power supply such as a copper oxide rectifier or one employing electron tubes for converting alternating current to direct current. Conductor 51 is connected to one of the control terminals of two double-pole-double-throw switches 52 and 53. Switches 52 and 53 are contained in a control box 54 which may be located some distance from projector 10. Conductor 50 is connected to the other central terminals of switches 52 and 53. Motor 26 has briefly been described before and another motor 55 has a shaft 56 connected through a gear train 57 through drive shaft 18 connected to spur gear 17. Motor 55 is connected through a current limiting resistor 60 to opposite terminals on both sides of switch 52 so that the polarity of the voltage may be reversed to the motor to provide a reversible operation for the motor. In other words, switch 52 forms the common type of reversing switch as does switch 53. A parallel circuit is formed as a return conductor for motor 55 where a conductor 61, connected to motor 55, is connected to one of the terminals of limit switch 41 which is a single-pole-single-throw switch and to one of the outside terminals of reversing switch 52. The other terminal of switch 41 is connected to a terminal on the opposite side of switch 52 through a conductor 62.

Switch arm 42 is shown diagrammatically and in engagement with the lower portion of film chart 12 and the switch blade of switch 41. Since film chart 12 is driven through shaft 18, upon it reaching its lower most position, switch 41 is opened and the circuit no longer energizes motor 55.

Motor 26 is operated by having a pair of conductors 63 and 65 connected to a pair of the terminals on one side of reversing switch 53 and to opposite terminals on the other side of switch 53. Conductor 63 is connected to resilient contact 36 and conductor 65 is connected to resilient contact 36 through a current limiting resistor 64.

All of the conductors extending between control box 54 and the motors and gear trains housed in projector 10 may be encased in a single cable 66, it being understood that cable 66 may be of any convenient length.

OPERATION

Where the film chart such as chart 12 is used, by the movement of switch 52 in a proper position, film chart 12 may be moved from its upward position to its lower position or stopped at any intermediate position relating to any of the images on the film chart to project that particular image. Upon the film chart reaching its lower limit of travel, switch 41 is actuated and film chart 12 is no longer driven downwardly. Should it be desirable to project an image of rotatable elements 14 or 15, it is only necessary to manipulate switch 52 until the proper image is brought into view from the projector. Where it is desirable to rotate the movable elements 14 or 15, switch 53 may then be actuated to produce either clockwise or counter-clockwise motion. Assuming, for purposes of illustration, that chart 12 is in its position as shown in FIG. 1, current is supplied to motor 26 and the images may be rotated. Upon motor 55 being actuated, film chart 12 may be driven downwardly until switch 41 is actuated. It should be noted that independent control may be exercised over motor 26 to cause rotation of the rotatable element 15.

Film chart 12 may then be driven upwardly and continue in an upwardly direction since there is no obstruction or reason to limit the travel of the film chart 12 in a vertically upward direction, and therefore when it reaches its upper limit, sprocket 17 merely continues to urge film chart upwardly and slip over the end thereof. At this point, should the operator desire to remove chart 12 from the projector, it is only necessary that he pull the chart from the projector in the normal manner. If for some reason, power should be applied to contacts 35 and 36 at this time, and they should be placed against the metal film chart, thus causing a short across contacts 35 and 36, current limiting resistor 64 insures that the power supply 45 is thus protected.

Thus it can be seen that there has been shown and described improved remote control means for actuating the film chart of an acuity projector. Specifically it has been demonstrated that the film chart may be alternated between a pair of rotating images or elements and the images or elements rotatably controlled without external connections such as wires or cable elements connected to the driving means of the film chart. Futhermore, the film chart and the movable elements therein may be remotely controlled without causing movement of the chart or rotating elements when the remote control unit is moved from one location to another such as is encountered in mechanical connecting devices. By the use of the invention set forth herein, a convenient means for replacement of the film charts may be had.

It should also be recognized that the projectors are generally mounted upon a wall behind the operators and are aligned in a manner such that the projector slopes downwardly towards the front portion of the projector. By locating the motor 26 and gear train on the side of film chart 12 nearest the light source, the center of gravity of the unit passes approximately through an axis about the center of the slide and thus any binding action between slide 12 and sprocket 17 is greatly reduced. In other words, if the motor and gearing are mounted on the front portion of the slide or film chart 12, a twisting action is imparted to chart 12 with respect to sprocket 17 and the results do not prove to be as satisfactory.

It will, of course, be understood that various changes may be made in the form, details, arrangement and proportions of the parts without departing from the scope of my invention which consists of the matter shown and described herein and set forth in the appended claims.

I claim:

1. In visual acuity projector apparatus, the improvement comprising:
    (a) a projector including a light source and a film chart adapted to be controllably moved in a vertical plane across the light beam from said projector between predetermined limits of travel, said film chart including visual acuity test characters and at least one rotating element for testing astigmatism rotatable between predetermined limits;
    (b) a first electrical driving means disposed on said projector;
    (c) translational drive means drivably connected between said film chart and said first electrical driving means for vertically moving said film chart;
    (d) a second electrical driving means attached to the upper end of said film chart and connected to at least said one rotating element thereof including a motor connected to reduction gearing, said motor and gearing being disposed on the upper end of said film chart on the side nearest to said light source, said second electrical driving means being adapted to be controlled electrically when said film chart is drivably engaged with said translational drive means;
    (e) a pair of elongated electrical contacts insulatedly attached in a vertical direction along said film chart adjacent its upper vertical end and electrically connected to said second electrical driving means;
    (f) a pair of resiliently urged electrical contacts insulatedly attached to said projector and engaging said pair of electrical contacts on said film chart when said film chart is disposed within a predetermined range from its lower limit of travel;
    (g) and control means electrically connected to said first and second electrical driving means for controlling the movement of said film chart.

2. The invention as set forth in claim 1 wherein said control means includes electrical switch means for controlling the limit of downward travel of said film chart.

3. The invention as set forth in claim 1 wherein said control means includes remote switching means capable of being movingly located without causing movement of said film chart or at least said one rotating element upon being so moved.

4. The invention as set forth in claim 1 wherein said control means includes remote means for causing said rotary sources of power to move said film chart and said rotating element contained therein independently of each other.

References Cited
UNITED STATES PATENTS

| | | | |
|---|---|---|---|
| 1,579,880 | 4/1926 | Meissner et al. | 88—26 |
| 2,065,430 | 12/1936 | Cohen | 351—17 |
| 2,233,134 | 2/1941 | Kessler | 273—142 |
| 2,235,876 | 3/1941 | Gertz | 273—142 |
| 2,299,973 | 10/1942 | Getten | 88—28 |
| 2,366,554 | 1/1945 | Peck et al. | 351—30 X |
| 2,771,005 | 11/1956 | Correll | 88—56 |
| 3,146,663 | 9/1964 | Kirkconnell et al. | 88—24 |
| 3,294,473 | 12/1966 | Haugen | 351—30 |

DAVID H. RUBIN, *Primary Examiner.*